United States Patent [19]

Raulerson et al.

[11] Patent Number: 5,672,263

[45] Date of Patent: Sep. 30, 1997

[54] METHOD AND APPARATUS FOR ELECTROCHEMICALLY MACHINING A WORKPIECE

[75] Inventors: David A. Raulerson, Palm Beach Gardens; Brian J. Schwartz, Royal Palm Beach, both of Fla.

[73] Assignee: United Technologies Corporation, Hartford, Conn.

[21] Appl. No.: 654,942

[22] Filed: May 29, 1996

[51] Int. Cl.$^6$ .............................. B23H 3/00; B23H 7/18; B23H 7/32
[52] U.S. Cl. .................... 205/641; 204/224 M; 205/652
[58] Field of Search ................ 205/641–646, 205/652, 654; 204/224 M, 212

[56] References Cited

U.S. PATENT DOCUMENTS

| | | | |
|---|---|---|---|
| 2,319,196 | 5/1943 | Anderson et al. | 204/195 |
| 2,979,444 | 4/1961 | Tiley | 204/143 |
| 3,162,589 | 12/1964 | Pensak | 204/143 |
| 3,188,284 | 6/1965 | Flinn et al. | 204/143 |
| 3,280,016 | 10/1966 | Bass et al. | 205/642 |
| 3,448,024 | 6/1969 | Philpott | 204/143 |
| 3,453,192 | 7/1969 | Wilkinson et al. | 204/143 |
| 3,479,273 | 11/1969 | Taylor et al. | 204/224 |
| 3,567,604 | 3/1971 | Bodine | 205/642 |
| 3,625,853 | 12/1971 | Melvin et al. | 204/224 |
| 3,669,867 | 6/1972 | Adachi | 204/224 |
| 4,170,528 | 10/1979 | Mathews | 205/644 |
| 4,257,865 | 3/1981 | Semashko et al. | 205/642 X |
| 4,365,133 | 12/1982 | Inoue | 219/69.17 |
| 4,541,909 | 9/1985 | Fromson | 204/129.2 |
| 4,687,563 | 8/1987 | Hayes | 204/224 M |
| 5,274,566 | 12/1993 | Reed et al. | 364/474.37 |

*Primary Examiner*—Donald R. Valentine
*Attorney, Agent, or Firm*—Richard D. Getz

[57] ABSTRACT

According to the present invention, a method and apparatus for electrochemically machining a workpiece is provided. The method includes the steps of: (1) providing a machine head, having an electrically conductive face; (2) providing a sensor, for sensing a distance between a first surface and a second surface of the workpiece; (3) positioning the electrically conductive face in close proximity to the first surface, leaving a substantially constant space therebetween; (4) providing a pool of fluid in contact with the second surface of the workpiece; (5) placing the sensor in communication with the pool of fluid; (6) disposing an electrolytic fluid in the space between the electrically conductive face and the first surface; (7) establishing a potential difference between the workpiece and the electrically conductive face, thereby causing charged particles of the workpiece to migrate from the first surface into the electrolytic solution at a rate; and (8) sensing the distance between the first and second surfaces through the pool of fluid, the sensor providing a real-time signal representative of the distance.

15 Claims, 1 Drawing Sheet

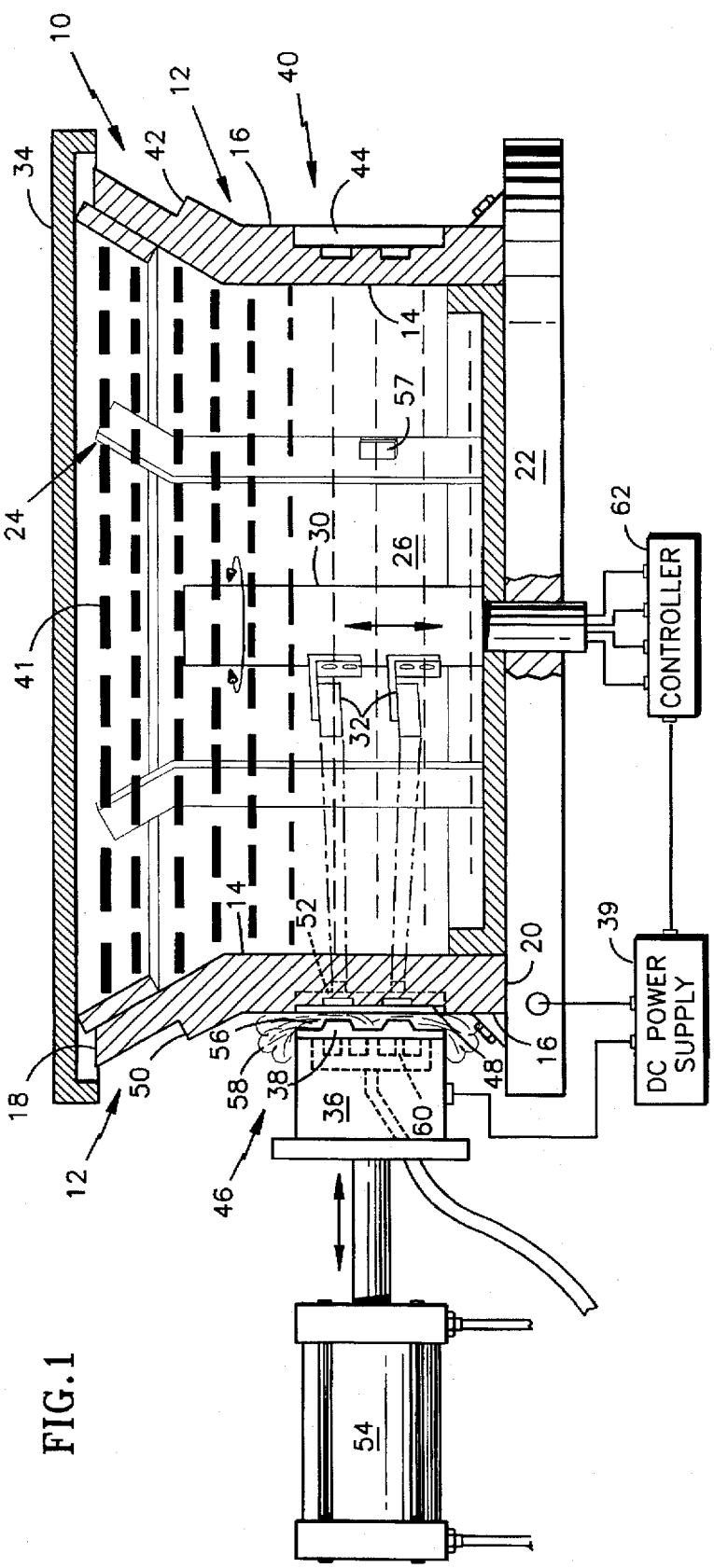

METHOD AND APPARATUS FOR ELECTROCHEMICALLY MACHINING A WORKPIECE

BACKGROUND OF THE INVENTION

1. Technical Field

This invention applies to electrochemical/chemical machining processes in general, and to methods for measuring the workpiece being machined in particular.

2. Background Information

In many cases where conventional machine tooling cannot be used or is not cost effective, electrochemical machining (ECM) provides the means to shape a workpiece. The workpiece is connected to an electrical power source as an anode and a conductive member is connected to the power source as a cathode. A ram positions the conductive member adjacent the workpiece and electrolytic solution is disposed therebetween. A potential difference established between the anodic workpiece and cathodic conductor causes charged particles of the workpiece to migrate from the surface of the workpiece toward the conductor, thereby eroding the surface of the workpiece.

While ECM does provide several advantages (e.g., cold work machining process, complex geometry capability, delicate workpiece capability, etc.), it is not without disadvantages. The rate at which material is removed from the workpiece (removal rate) often fluctuates making workpiece dimensions difficult to accurately ascertain. For example, the removal rate can vary during a machining process if the electrolytic solution becomes saturated with contaminates produced during the ECM process. Workpiece dimensions can also be difficult to determine if the workpiece moves during the ECM process. Workpiece movement can be caused by residual stresses releasing within a piece, or deflection caused by the ram and electrolytic fluid. In fact, because of either of these difficulties, it is often necessary to stop the ECM process and take a mechanical measurement of the workpiece. A person of skill in the art will recognize that stopping the ECM process numerous times for measurement purposes adds substantial time to the process, adds considerably to the cost of the process, and unnecessarily adds complexity should the ECM process need to be re-started to remove more material.

In short, what is needed is a method and apparatus for ECM that permits accurate measurements of the workpiece at anytime during the process, irrespective of fluctuations in the removal rate and/or movement of the workpiece.

DISCLOSURE OF THE INVENTION

It is, therefore, an object of the present invention to provide an accurate method for measuring a workpiece undergoing an ECM process.

It is a further object of the present invention to provide a real-time method for measuring a workpiece undergoing an ECM process.

It is a still further object of the present invention to provide a method for measuring a workpiece undergoing an ECM process that minimizes the amount of time necessary to perform the machining process.

According to one aspect of the present invention, a method for electrochemically machining a workpiece is provided, comprising the steps of: (1) providing a machine head, having an electrically conductive face; (2) providing a sensor, for sensing a distance between a first surface and a second surface of the workpiece; (3) positioning the electrically conductive face in close proximity to the first surface, leaving a substantially constant space therebetween; (4) providing a pool of fluid in contact with the second surface of the workpiece; (5) placing the sensor in communication with the pool of fluid; (6) disposing an electrolytic fluid in the space between the electrically conductive face and the first surface; (7) establishing a potential difference between the workpiece and the electrically conductive face, thereby causing charged particles of the workpiece to migrate from the first surface into the electrolytic solution at a rate; and (8) sensing the distance between the first and second surfaces through the pool of fluid, the sensor providing a real-time signal representative of the distance.

According to another aspect of the present invention, an apparatus for electrochemically machining a workpiece is provided, which includes a machine head, a sensor, means for selectively dispensing electrolytic fluid between the workpiece and the machine head, and a power supply. The machine head includes an electrically conductive face. The sensor, which senses the distance between a first surface and a second surface of the workpiece, is in communication with the pool of fluid in contact with the second surface. The power supply selectively creates a potential difference between the workpiece and the electrically conductive face of the machine head. Creating a potential difference between the workpiece and the face, causes charged particles of the workpiece to migrate from the first surface into electrolytic solution disposed between the workpiece and the face. The sensor provides a real-time signal representative of the distance between the first and second surfaces.

An advantage of the present invention is that an accurate method for measuring a workpiece undergoing an ECM process is provided. The present invention senses the thickness of the workpiece section being machined while that section is being machined; i.e., a "real-time" measurement. Real-time measurements eliminate inaccuracies due to machining rate fluctuations attributable to, for example, contamination within the electrolytic solution or changes within the gap between the workpiece and the conductive head. Another advantage of ECM with real-time measurement is that the ECM process can be done in a fraction of the time required at present because the process does not have to be stopped to measure the workpiece.

Another advantage of the present invention is that it facilitates ECM of workpieces having complex geometries. With some workpiece geometries, it is difficult at best to measure the section being machined using conventional measurement techniques. This is particularly true when the workpiece geometry does not permit a conventional transducer to be positioned next to, or in contact with, the workpiece at the critical point. The present method, on the other hand, permits the sensor means to be positioned a distance away from the critical point since the sensing is done within a pool of fluid.

Still another advantage of the present invention is that movement of the workpiece can be accommodated. Workpiece dimension is sometimes determined by the position of the ram and conductive head. In the event a workpiece moves during the ECM process due to ram/fluid pressure or stress relief, the position of the workpiece will be unknown relative to the ram and conductive head. In those instances, the workpiece may be closer or farther away from the conductive head and the dimension of the workpiece cannot be accurately ascertained using conventional ECM techniques. The present invention avoids this problem by continuously sensing the position and thickness of the workpiece.

3

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 shows a sectional diagrammatic view of a workpiece, sensors within a pool of fluid, and a machine head disposed adjacent the workpiece.

FIG. 2 shows a diagrammatic view of a sensor sensing a workpiece dimension through a containment means and a pool of fluid.

BEST MODE FOR CARRYING OUT THE INVENTION

Referring to FIG. 1, a metallic workpiece 10 having walls 12 defined by inner 14, outer 16, top 18, and bottom 20 surfaces is mounted on a rotatable table 22. The distance between the inner 14 and outer 16 surfaces at any point along a wall 12 may be referred to as the "thickness" of the wall 12 at that particular point. A brace 24 disposed in the interior 26 of the workpiece 10, which includes means (not shown) for sealing along the bottom surface 20, adds rigidity to the workpiece 10 to facilitate the machining process. The interior 26 of the workpiece 10 shown in FIG. 1 is defined as the volume surrounded by the inner surfaces 14 of the workpiece 10 and the brace 24 along the bottom surface. A post 30 for supporting one or more sensors 32 is positioned within the interior 26 of the workpiece 10, extending up through the brace 24. The post 30 may be rotated or moved vertically to adjust the position of the sensors 32. The sensors 32 are ultrasonic type sensors 32 capable of being submerged in a fluid bath and sensing within a fluid environment. An Aerotech ultrasonic transducer, model number 113-156-360, 10 Mhz, 10" Focus, 0.75" diameter, manufactured by the Krautkramer Branson of Lewiston, Pa., USA is an example of an acceptable commercially available transducer for sensing the thickness of a wall at a particular point. A cover 34 is placed over the workpiece 10 to keep contaminants from entering the interior 26 of the workpiece 10.

A machining head 36, also known as a "shaped head", includes a electrode 38 powered by a power supply 39 and is disposed outside the walls 12 of the workpiece 10. The electrode 38, generally referred to as the "cathode", is shaped to correspond to the geometry sought within of the workpiece surface. For example, if a circular pocket (not shown) is being machined, the cathode 38 would be circular having a diameter slightly less than that of the pocket. In the example shown in FIG. 1, the machined side 40 of the workpiece 10 shows an embossment 42 extending out from the workpiece 10 and a shaped pocket 44 extending into the wall 12 of the workpiece 10. The embossment 42 is formed when adjacent material is removed. The pocket 44, on the other hand, is formed by removing material within the pocket 44. The unfinished side 46 of the workpiece 10 shows a pocket 48 and an adjacent embossment 50 being formed at the same time by the shaped head 36. The ghost line 52 illustrates the final shape of the embossment 50 and pocket 48. A person of skill in the art will recognize that the cathode 38 can assume a variety of geometries to facilitate the machining of the workpiece 10. The shaped head 36 is positioned relative to the workpiece 10 by means for linear displacement such as a hydraulic cylinder 54.

Using the present invention method, the workpiece 10 can be machined by positioning the cathode 38 of the shaped head 36 in close proximity to the outer surface 16 of the workpiece 10. A substantially constant space 56, or "gap", is left between the cathode 38 and the outer surface 16 of the workpiece 10. The gap 56, typically between 0.001 and 0.050 inches, is empirically determined considering factors such as the material being machined and the current setting of the power supply 39. Too small a gap can cause undesirable arcing between the cathode 38 and the workpiece 10 and too large a gap can cause nonuniform machining and decreased machining efficiency.

The interior 26 of the workpiece 10 is filled with water 41 or other fluid coolant to absorb thermal energy produced during the ECM process. If the amount of thermal energy produced by the ECM is too great for the volume of water within the workpiece interior 26, it may be necessary to cycle cool water through the interior 26.

The fluid within the interior 26 may also be described as being in communication with the sensors in that it provides a conductive medium for the ultrasonic sensors 32 submerged therein. The sensors 32 are calibrated by sensing a reference block 57 having a known width. In the case of the circular workpiece 10 shown in FIG. 1, the reference block 57 is attached to the brace 24 at a circumferential position aside from the surface to be machined, at approximately the same radial distance from the sensors 32 as the wall 12 to be sensed. After the sensors 32 are calibrated, the post 30 is rotated circumferentially into alignment with the surface to be machined. If the workpiece 10 is other than circular, the post 30 supporting the sensors 32 can be linearly or otherwise displaced rather than rotated, to facilitate calibration.

Referring to FIG. 2, in an alternative embodiment the sensors 32 are not submerged in the pool of fluid 41 but rather are disposed outside a containment means 43 holding the fluid 41 in contact with the inner surface 14. In this embodiment, the sensors 32 sense the workpiece 10 dimension by sending signals through the containment means 43 and fluid 41. In other words, the sensors 32 are in communication with both the containment means 43 and the fluid 41. Adhesive 45 or other conductive medium may be necessary to place the sensor 32 in communication with the containment means 43.

A flow of electrolytic fluid 58 is selectively provided between the cathode 38 and the workpiece 10, running from a plurality of ports 60 disposed in the cathode 38. The ports 60 are shown diagrammatically in phantom line within the FIG. 1. The flow from each port 60 cumulatively fills the gap 56 between the cathode 38 and the outer surface 16 of the wall 12, thereby providing a conductive path between the cathode 38 and the outer surface 16. A person of skill in the art will recognize that a solution of sodium chloride and water is an example of an acceptable electrolytic solution. The exact concentration and temperature of the solution will vary depending upon the application at hand.

The anodic workpiece 10 and the cathode 38 of the shaped head are connected to the power supply 39 to selectively establish a potential difference between the cathode 38 and the workpiece 10. The amount of electrical current necessary to cream the potential difference will vary depending upon the material of the workpiece 10, the quantity of workpiece surface area being machined, the rate at which the machining is occurring, etc. The potential difference between the cathode 38 and the workpiece 10 causes charged particles to migrate from the workpiece 10 toward the cathode 38. Before they can reach the cathode 38, however, they are carried away by the electrolytic solution. In some circumstances, the electrolytic solution is collected and passed through a filter means to remove the charged particles. The filtered solution is subsequently recycled through the cathode 38 again.

During the machining process, the ultrasonic sensors 32 sense the distance between the inner 14 and outer 16 surfaces at a particular point, sending signals through the pool of water 41. This sensing, which enables the operator to know the present thickness of the workpiece 10 and the rate of change of thickness at any time during the machining process, may be done continuously or periodically. Thus, the sensor signal can be used in a "process monitoring" manner where the operator has the option of altering the machining process to avoid over-machining the part.

Alternatively, the sensor signal can be used in a "process control" manner by employing a controller 62 connected to the sensors 32 and to the power supply 39. The controller can be programmed, for example, to establish an initial machining rate, maintain that rate until a certain thickness is reached given input from the sensors 32, and decrease the machining rate to a second slower rate until a final thickness is reached. A variety of control schemes other than the example given can be stored in the controller 62 to facilitate different machining tasks. The controller 62 can also be used to store several machining tasks. For example, if the machining is completed at a first section of the workpiece 10, the workpiece 10 and the sensors can be manipulated to bring a second section into alignment with the shaped head, and so forth until all the machining with that particular head is completed.

Although this invention has been shown and described with respect to the detailed embodiments thereof, it will be understood by those skilled in the art that various changes in form and detail thereof may be made without departing from the spirit and the scope of the invention.

We claim:

1. A method for electrochemically machining a workpiece, comprising the steps of:
    providing a machine head, having an electrically conductive face;
    providing a sensor, for sensing a distance between a first surface and a second surface of the workpiece;
    positioning said electrically conductive face in close proximity to said first surface, leaving a substantially constant space therebetween;
    providing a pool of fluid in contact with said second surface of the workpiece;
    placing said sensor in communication with said pool;
    disposing an electrolytic fluid in said space between said electrically conductive face and said first surface;
    establishing a potential difference between the workpiece and said electrically conductive face, thereby causing charged particles of the workpiece to migrate from said first surface into said electrolytic solution at a rate; and
    sensing said distance between said first and second surfaces through said pool of fluid, said sensor providing a real-time signal representative of said distance.

2. A method for electrochemically machining a workpiece according to claim 1, wherein said step of placing said sensor in communication with said pool, comprises:
    submerging said sensor in said pool.

3. A method for electrochemically machining a workpiece according to claim 2, wherein said sensor senses the workpiece ultrasonically, and said fluid provides a medium through which ultrasonic energy can be transmitted.

4. A method for electrochemically machining a workpiece according to claim 2, further comprising the step of:
    adjusting said rate of charged particle migration from said workpiece, wherein said rate can be decreased or increased by decreasing or increasing said potential difference, respectively.

5. A method for electrochemically machining a workpiece according to claim 4, further comprising the step of:
    providing means for controlling said rate of charged particle migration from the workpiece, wherein said control means accepts said signal from said sensor and selectively adjusts said rate of charged particle migration in response to said signal.

6. A method for electrochemically machining a workpiece according to claim 5, wherein said sensor senses the workpiece ultrasonically, and said fluid provides a medium through which ultrasonic energy can be transmitted.

7. A method for electrochemically machining a workpiece according to claim 6, further comprising the step of calibrating said sensor.

8. A method for electrochemically machining a workpiece according to claim 7, wherein said step of calibrating said sensor comprises:
    sensing a reference block having a known width disposed within said pool of fluid.

9. An apparatus for electrochemicall machining a workpiece, comprising:
    a machine head, having an electrically conductive face;
    a sensor, for sensing a distance between a first surface and a second surface of the workpiece, said sensor adapted to sense the workpiece through a pool of fluid in contact with said second surface;
    means for selectively dispensing electrolytic fluid between said face and said first surface, wherein said face is disposed in close proximity to said first surface; and
    a power supply, for creating a potential difference between the workpiece and the electrically conductive face of the machine head;
    wherein creating a potential difference between the workpiece and said face, causes, charged particles of the workpiece to migrate from said first surface into said electrolytic solution at a rate; and
    wherein said sensor provides a real-time signal representative of said distance.

10. An apparatus for electrochemically machining a workpiece according to claim 9, wherein said sensor includes means for ultrasonically sensing said distance between said first and second surfaces of said workpiece.

11. An apparatus for electrochemically machining a workpiece according to claim 9, further comprising:
    means for controlling said rate of charged particle migration from the workpiece, wherein said control means accepts said signal from said sensor and selectively adjusts said rate of charged particle migration in response to said signal.

12. An apparatus for electrochemically machining a workpiece according to claim 11, wherein said sensor includes means for ultrasonically sensing said distance between said first and second surfaces of said workpiece.

13. An apparatus for electrochemically machining a workpiece comprising:
    a machine head, having art electrically conductive face;
    a sensor, for sensing a distance between a first surface and a second surface of the workpiece, said sensor adapted to sense the workpiece through a pool of fluid in contact with said second surface;

means for selectively dispensing electrolytic fluid between said face and said first surface, wherein said face is disposed in close proximity to said first surface; and a power supply, for creating a potential difference between the workpiece and the electrically conductive face of the machine head;

wherein creating a potential difference between the workpiece and said face, causes charged particles of the workpiece to migrate from said first surface into said electrolytic solution at a rate; and wherein said sensor provides a real-time signal representative of said distance; and wherein said sensor is submerged in said pool of fluid.

14. An apparatus for electrochemically machining a workpiece according to claim 13, wherein said sensor includes means for ultrasonically sensing said distance between said first and second surfaces of said workpiece.

15. An apparatus for electrochemically machining a workpiece, comprising:

a machine head, having an electrically conductive face;

a sensor, for sensing a distance between a first surface and a second surface of the workpiece, said sensor adapted to sense the workpiece through a pool of fluid in contact with said second surface;

means for selectively dispensing electrolytic fluid between said face and said first surface, wherein said face is disposed in close proximity to said first surface; and a power supply, for creating a potential difference between the workpiece and the electrically conductive face of the machine head;

wherein creating a potential difference between the workpiece and said face, causes charged particles of the workpiece to migrate from said first surface into said electrolytic solution at a rate; and wherein said sensor provides a real-time signal representative of said distance; and means for controlling said rate of charged particle migration from the workpiece, wherein said control means accepts said signal from said sensor and selectively adjusts said rate of charged particle migration in response to said signal.

* * * * *